US012581136B2

(12) United States Patent
Su et al.

(10) Patent No.: US 12,581,136 B2
(45) Date of Patent: Mar. 17, 2026

(54) WORKLOAD ALLOCATION AND PROCESSING IN CLOUD-BASED CODING OF HDR VIDEO

(71) Applicant: Dolby Laboratories Licensing Corporation, San Francisco, CA (US)

(72) Inventors: Guan-Ming Su, Fremont, CA (US);
Harshad Kadu, Santa Clara, CA (US);
Neeraj J. Gadgil, Pune (IN)

(73) Assignee: Dolby Laboratories Licensing Corporation

( * ) Notice: Subject to any disclaimer, the term of this patent is extended or adjusted under 35 U.S.C. 154(b) by 437 days.

(21) Appl. No.: 18/002,760

(22) PCT Filed: Jul. 8, 2021

(86) PCT No.: PCT/US2021/040967
§ 371 (c)(1),
(2) Date: Dec. 21, 2022

(87) PCT Pub. No.: WO2022/011194
PCT Pub. Date: Jan. 13, 2022

(65) Prior Publication Data
US 2023/0291937 A1 Sep. 14, 2023

Related U.S. Application Data

(60) Provisional application No. 63/049,673, filed on Jul. 9, 2020.

(30) Foreign Application Priority Data

Jul. 9, 2020 (EP) .................................... 20184883

(51) Int. Cl.
| *G06K 9/36* | (2006.01) |
| *G06F 9/50* | (2006.01) |
(Continued)

(52) U.S. Cl.
CPC ............... *H04N 19/98* (2014.11); *G06F 9/50* (2013.01); *H04N 19/192* (2014.11); *H04N 19/436* (2014.11)

(58) Field of Classification Search
None
See application file for complete search history.

(56) References Cited

U.S. PATENT DOCUMENTS

| 5,889,989 | A | * | 3/1999 | Robertazzi | ............ G06F 9/5088 718/105 |
| 6,370,560 | B1 | * | 4/2002 | Robertazzi | ............ G06F 9/5088 718/100 |

(Continued)

FOREIGN PATENT DOCUMENTS

| CN | 104539730 A | * | 4/2015 | ......... H04L 67/1027 |
| CN | 111290841 A | * | 6/2020 | ........... G06F 9/4881 |

(Continued)

OTHER PUBLICATIONS

Tian et al., "High performance cluster-based transcoder," 2010 International Conference on Computer Application and System Modeling (ICCASM 2010), Taiyuan, 2010, pp. V2-48-V2-52 (Year: 2010).*

(Continued)

*Primary Examiner* — Feng Niu

(57) ABSTRACT

In a cloud-based system for encoding high dynamic range (HDR) video, a computing node is assigned to be a dispatcher node, segmenting the input video into scenes and generating a scene to segment allocation to be used by other computing nodes. The scene to segment allocation process includes one or more iterations with an initial random assignment of scenes to computing nodes, followed by a refined assignment based on optimizing the allocation cost across all the computing nodes. Methods to generate scene-based forward and backward reshaping functions to opti- (Continued)

300

305 — INITIAL RANDOM ASSIGNMENT

310 — REFINE ASSIGNMENT

315 — UPDATE BEST ASSIGNMENT COST AND BEST S2S ASSIGNMENT

DONE? — NO

320 YES

325 — OUTPUT BEST SCENE TO SEGMENT ASSIGNMENT mize video coding and improve the coding efficiency of reshaping-related metadata are also examined.

13 Claims, 3 Drawing Sheets

(51) Int. Cl.
*G06K 9/46*      (2006.01)
*H04N 19/192*      (2014.01)
*H04N 19/436*      (2014.01)
*H04N 19/98*      (2014.01)

(56) References Cited

U.S. PATENT DOCUMENTS

| | | | | |
|---|---|---|---|---|
| 8,711,154 | B2 * | 4/2014 | Steinberg | G06F 9/505 |
| | | | | 375/240.24 |
| 8,811,490 | B2 | 8/2014 | Su | |
| 9,264,681 | B2 | 2/2016 | Gish | |
| 9,723,047 | B2 * | 8/2017 | Van Brandenburg | |
| | | | | H04L 65/1069 |
| 9,852,075 | B2 * | 12/2017 | Andre | G06F 12/023 |
| 9,917,777 | B2 * | 3/2018 | Buchnik | G06F 11/0724 |
| 10,264,287 | B2 | 4/2019 | Wen | |
| 10,397,576 | B2 | 8/2019 | Kadu | |
| 10,516,717 | B2 * | 12/2019 | Van Brandenburg | H04L 65/65 |
| 10,575,028 | B2 | 2/2020 | Kadu | |
| 10,659,749 | B2 | 5/2020 | Kadu | |
| 11,238,295 | B2 * | 2/2022 | Papandreou | G06V 10/95 |
| 11,277,627 | B2 | 3/2022 | Song | |
| 2011/0157193 | A1 * | 6/2011 | Boucher | G06F 9/5083 |
| | | | | 345/1.3 |
| 2013/0104177 | A1 | 4/2013 | Kwan | |
| 2013/0167187 | A1 * | 6/2013 | Pieper | H04N 19/80 |
| | | | | 725/116 |
| 2014/0379871 | A1 * | 12/2014 | Van Brandenburg | H04L 65/65 |
| | | | | 709/219 |
| 2015/0200854 | A1 * | 7/2015 | Buchnik | H04L 47/10 |
| | | | | 709/235 |
| 2016/0036882 | A1 | 2/2016 | Jin | |
| 2017/0147494 | A1 * | 5/2017 | Andre | G06F 12/0864 |
| 2017/0353522 | A1 * | 12/2017 | Van Brandenburg | H04L 67/01 |
| 2018/0031666 | A1 * | 2/2018 | Krueger | G01R 33/56509 |
| 2018/0098094 | A1 | 4/2018 | Wen | |
| 2019/0349607 | A1 | 11/2019 | Kadu | |
| 2020/0302203 | A1 * | 9/2020 | Papandreou | H04L 67/10 |
| 2021/0385443 | A1 * | 12/2021 | Masule | H04N 19/114 |
| 2023/0343100 | A1 | 10/2023 | Kadu | |

FOREIGN PATENT DOCUMENTS

| | | | |
|---|---|---|---|
| EP | 3306563 | B1 | 1/2022 |
| JP | 2002199392 | A | 7/2002 |
| JP | 2010529809 | A | 8/2010 |
| WO | 2019217751 | A1 | 11/2019 |
| WO | 2023022956 | A1 | 2/2023 |

OTHER PUBLICATIONS

Elkholy et al., "Self adaptive Hadoop scheduler for heterogeneous resources." In 2014 9th International Conference on Computer Engineering & Systems (ICCES), pp. 427-432. IEEE, 2014. (Year: 2014).*

Markatos et al., "Using processor affinity in loop scheduling on shared-memory multiprocessors," in IEEE Transactions on Parallel and Distributed Systems, vol. 5, No. 4, pp. 379-400, Apr. 1994, doi: 10.1109/71.273046. (Year: 1994).*

Jeon et al., "MapReduce-Based Distributed Video Encoding Using Content-Aware Video Segmentation and Scheduling," in IEEE Access, vol. 4, pp. 6802-6815, 2016, doi: 10.1109/ACCESS.2016. 2616540. (Year: 2016).*

Wikipedia, "Branch and cut", published on Jul. 7, 2020. (Year: 2020).*

CN-104539730-A (machine translation) (Year: 2015).*

CN-111290841-A (machine translation) (Year: 2020).*

Dong et al., "Multi-robot collaborative dense scene reconstruction." ACM Transactions on Graphics (TOG) 38, No. 4 (2019): 1-16. (Year: 2019).*

Huang, Jing-Chen, et al "On High Efficient Cloud Video Transcoding" International Symposium on Intelligent Signal Processing and Communication Systems, Nov. 9-12, 2015, pp. 170-173.

Katsavounidis, I. et al "Dynamic Optimizer—A perceptual Video Encoding optimization Framework" Netflix Technology Blog, published in Netflix Mar. 5, 2018.

Manohara, M. et al "Optimized Shot-based Encodes: Now Streaming!" Netflix Technology published in Netflix Techblog Mar. 9, 2018.

Papadopoulos, P. et al "A Fast Heuristic for Tile Partitioning and Processor Assignment in HEVC" 2018 25th IEEE International Conference on Image Processing, Oct. 7, 2018, pp. 4143-4147.

Zhang, N. et al "Adaptive Data Partitioning for Multiprocessor Implementation of MPEG2 Encoders" Proc. of 1997 IEEE International Symposium on Circuits and Systems, Jun. 9-12, 1997, vol. 2, pp. 1221-1224.

Zhang, N. et al "Study on Adaptive Job Assignment for Multiprocessor Implementation of MPEG2 Video Encoding" IEEE Transactions on Industrial Electronics, vol. 44, No. 5, Oct. 1997, pp. 726-734.

* cited by examiner

310

345 — INITIALIZE TOTAL ASSIGNMENT COST

350 — FOR NODE m
A: REMOVE A SCENE
B: ADD A SCENE
C: NO CHANGE

355 — COMPUTE COSTS FOR OPTIONS A,B,C

360 — SELECT ASSIGNMENT OPTION THAT MINIMIZES ASSIGNMENT COST

ALL NODES?          NO

YES

CAN TOTAL ASSIGNMENT COST BE IMPROVED?          YES

362          NO

365 — OUTPUT REFINED SCENE TO SEGMENT ASSIGNMENT AND CORRESPONDING REFINED ASSIGNMENT COST

WORKLOAD ALLOCATION AND PROCESSING IN CLOUD-BASED CODING OF HDR VIDEO

CROSS-REFERENCE TO RELATED APPLICATIONS

The present application is the U.S. national stage of International Patent Application No. PCT/US2021/040967 filed on Jul. 8, 2021, which in turn claims priority to U.S. Provisional Patent Application No. 63,049,673 and European Patent Application No. 20184883.5, both filed on Jul. 9, 2020, each of which is incorporated by reference in its entirety.

TECHNOLOGY

The present disclosure relates generally to images. More particularly, an embodiment of the present invention relates to workload allocation and processing in cloud-based coding of high dynamic range (HDR) video.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1,000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

In many video-distribution scenarios, HDR video may be coded in a multi-processor environment, typically referred to as a "cloud computing server." In such an environment, trade-offs among ease of computing, workload balance among the computing nodes, and video quality, may force reshaping-related metadata to be updated on a frame-by-frame basis, which may result in unacceptable overhead, especially when transmitting video at low bit rates. As appreciated by the inventors here, improved techniques for workload allocation and node-based processing to improve the quality of coded video in a cloud-based environment while minimizing the overhead of reshaping-related metadata are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods for workload allocation and node-based processing in cloud-based video coding of HDR video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to cloud-based reshaping and coding for HDR images. In an embodiment, in a cloud-based system for encoding HDR video, a node is assigned to be a dispatcher node segmenting the input video into scenes and generating a scene to segment allocation to be used by other computing nodes. A processor in the dispatcher node receives a sequence of scenes, wherein each scene comprises one or more video frames, then the processor:

receives a sequence of scenes, wherein each scene comprises one or more video frames; and performs one or more assignment iterations to generate a best output assignment, wherein performing the one or more assignment iterations comprises:

for an iteration in the one or more assignment iterations:

generating an initial random assignment (305) of the sequence of scenes to M computing nodes based on a random seed selection for the assignment iteration, wherein M>1;

performing a refine-assignment step (310) based on the initial random assignment to generate a refined assignment of the sequence of scenes to the M computing nodes and a refined assignment cost; and updating a best assignment cost and the best output assignment (315) based on the refined assignment and the refined assignment cost.

In another embodiment, for a node among the M computing nodes, a processor in the node accesses according to a scene to segments assignment a scene assigned to the node, the scene comprising a sequence of high-dynamic range (HDR) frames and a sequence of corresponding standard dynamic range frames (SDR), and generates an output bitstream and corresponding reshaping metadata using a scene-based forward reshaping function and a scene-based backward reshaping function.

Example HDR Coding System

Figure 1A:
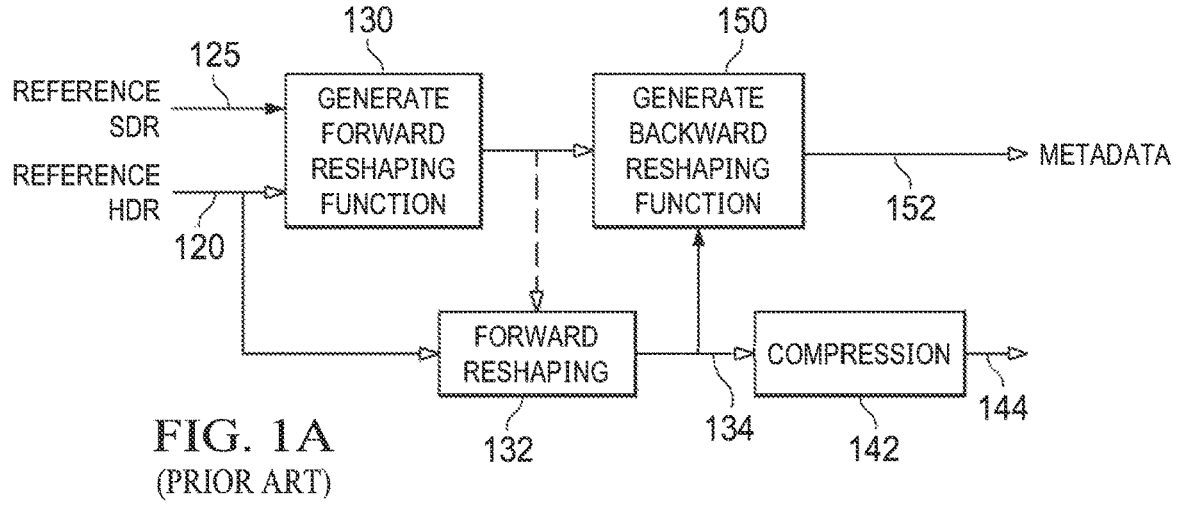
FIG. 1A depicts an example single-layer encoder for HDR data using a reshaping function according to prior art.
Figure 1B:
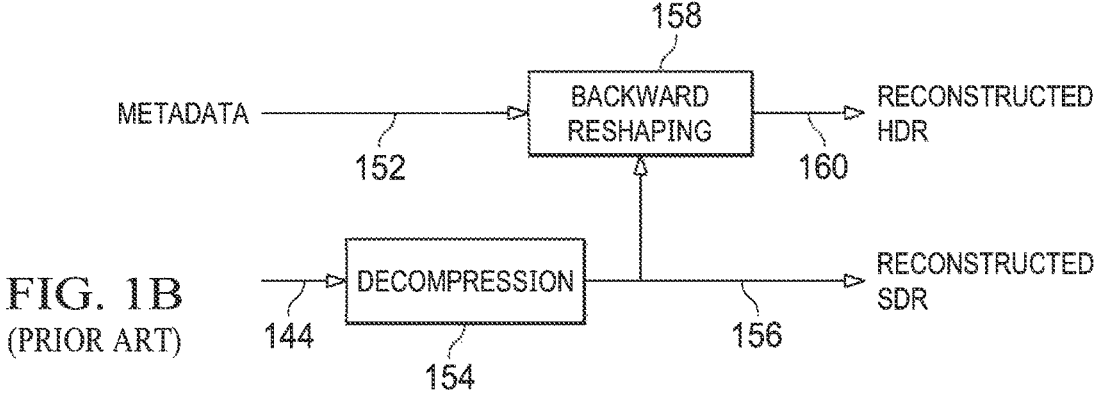
FIG. 1B depicts an example HDR decoder corresponding to the encoder of FIG. 1A, according to prior art.

FIG. 1A and FIG. 1B illustrate according to prior art an example single-layer backward-compatible codec framework using image reshaping. More specifically, FIG. 1A illustrates an example encoder architecture, which may be implemented with one or more computing processors in an upstream video encoder. FIG. 1B illustrates an example decoder architecture, which may also be implemented with one or more computing processors in one or more downstream video decoders.

Under this framework, given reference HDR content (120) and corresponding reference SDR content (125) (that is, content that represents the same images as the HDR content, but color-graded and represented in standard dynamic range), reshaped HDR content (134) is encoded and transmitted as SDR content in a single layer of a coded video signal (144) by an upstream encoding device that implements the encoder architecture. The received SDR content is received and decoded, in the single layer of the video signal, by a downstream decoding device that implements the decoder architecture. Backward-reshaping metadata (152) is also encoded and transmitted in the video signal with the reshaped content so that HDR display devices can reconstruct HDR content based on the (reshaped) SDR content and the backward reshaping metadata. Without loss of generality, in some embodiments, as in non-backward-compatible systems, reshaped SDR content may not be watchable on its own, but must be watched in combination with the backward reshaping function, which will generate watchable SDR or HDR content. In other embodiments which support backward compatibility, legacy SDR decoders can still playback the received SDR content without employing the backward reshaping function.

As illustrated in FIG. 1A, given HDR image (120) and a target dynamic range, after generating, in step 130, a forward reshaping function (132); given the forward reshaping function, a forward reshaping mapping step (132) is applied to the HDR images (120) to generate reshaped SDR base layer (134). A compression block (142) (e.g., an encoder implemented according to any known video coding algorithms, like AVC, HEVC, AV1, and the like) compresses/encodes the SDR images (134) in a single layer (144) of a video signal. In addition, a backward reshaping function generator (150) may generate a backward reshaping function which may be transmitted to a decoder as metadata (152). In some embodiments, metadata (152) may represent the forward reshaping function (130), thus, it would be up to the decoder to generate the backward reshaping function (not shown).

Examples of backward reshaping metadata representing/specifying the optimal backward reshaping functions may include, but are not necessarily limited to only, any of: an inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques, for example, and without limitation, as described later in this disclosure.

The backward reshaping metadata (152), as generated by the backward reshaping function generator (150) based on the reshaped SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the reshaped SDR images in the single layer (144) and the backward reshaping metadata (152) as a part of the overall image metadata are received as input on the decoder side of the codec framework. A decompression block (154) decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. In a backward-compatible system, the decoded SDR images (156) may be outputted in an output SDR video signal (e.g., over an HDMI interface, over a video link, etc.) to be rendered on an SDR display device.

Optionally, alternatively, or in addition, in the same or another embodiment, a backward reshaping block 158 extracts the backward (or forward) reshaping metadata (152) from the input video signal, constructs the backward reshaping functions based on the reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Cloud-Based Coding

Existing reshaping techniques may be frame-based, that is, new reshaping metadata is transmitted with each new frame, or scene-based, that is, new reshaping metadata is transmitted with each new scene. As used herein, the term "scene" for a video sequence (a sequence of frames/images) may relate to a series of consecutive frames in the video sequence sharing similar luminance, color and dynamic range characteristics. Scene-based methods work well in video-workflow pipelines which have access to the full scene; however, it is not unusual for content providers to use cloud-based multiprocessing, where, after dividing a video stream into segments, each segment is processed independently by a single computing node in the cloud. As used herein, the term "segment" denotes a series of consecutive frames in a video sequence. A segment may be part of a scene or it may include one or more scenes. Thus, processing of a scene may be split across multiple processors.

Figures 2, 3A:
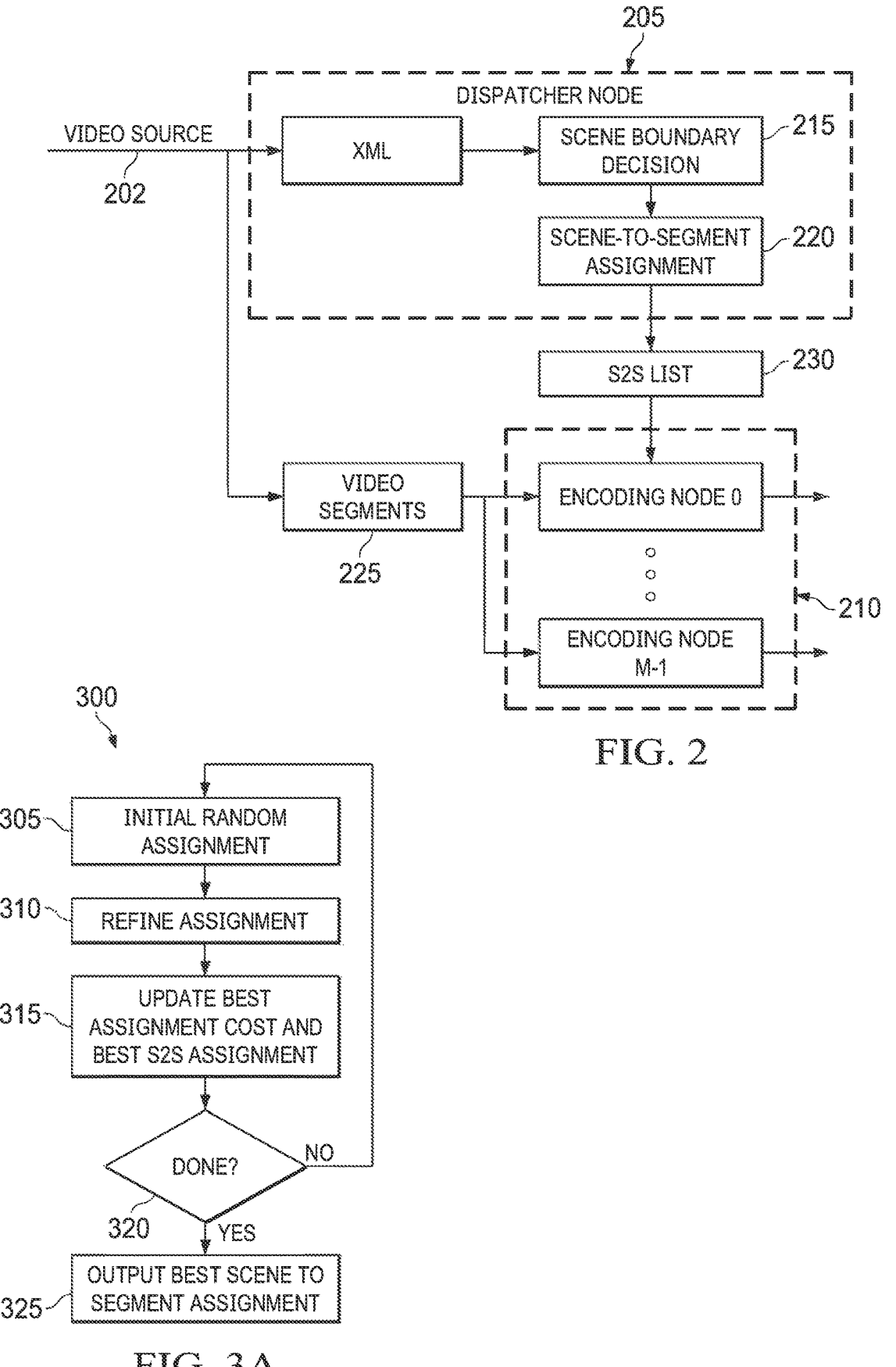
FIG. 2 depicts an example architecture for cloud-based encoding of HDR video according to an embodiment.
FIG. 3A depicts an example process for scene to segment assignment according to an embodiment.

As discussed in Ref. [1], in certain cloud-based applications, under certain quality constraints, segment-based processing may necessitate generating reshaping metadata on a frame-by-frame basis, resulting in undesirable overhead. This may be an issue in very low bit-rate applications (e.g., lower than 1 Mbit/s). FIG. 2 depicts an example architecture of a novel, scene-based, distributed architecture which allows for reduced data rates of the reshaping metadata, but without compromising the quality of the decoded video.

As depicted in FIG. 2, the proposed architecture comprises two stages: a) a dispatcher stage (205), typically, but with no limitation, implemented on a single computing node, which allocates scenes into segments and b) an encoding stage (210), where each node in the cloud encodes a sequence of segments.

Given a video source (202) for content distribution, typically referred to as a mezzanine file, the first stage node fetches video metadata (e.g., from XML file) and: (a) in step 215, it determines the scene boundaries and (b) in step 220, it decides the scene-to-segment assignment list for each worker node. The main goal for the scene boundary determination is to make sure there is no significant luminance or color change during normal playback within one scene, including fade-ins, fade-outs, and dissolves. (A dissolve in video editing refers to a smooth transition from one image to another. Dissolves between a blank (or black) image to another image are also referred to as a fade-in or a fade-out.) A goal of the scene-to-segment assignment unit (220) is to ensure one scene won't be partitioned and encoded in two different computing nodes, which may cause sudden changes near segment boundaries. In addition, the assignment task should strive for uniform workload across all computing nodes (210).

At the second stage (210), each computing node receives its own scene-to-segment list (S2S list) (230) from stage one, and its own partial mezzanine (225) for the corresponding segment from the input video (202). Each node, in parallel, encodes its assigned segments and outputs a coded bitstream. Details for each processing task are discussed next.

The Dispatcher Node

Depending on the requirements of workload distribution in each node, there are two main scenarios of interest. In one embodiment, segments may have non-uniform length, which allows for non-uniform workload in different nodes. This is tailored for a scene-based solution where a scene cannot be partitioned to be encoded in more than one node. In another embodiment, segments have a fixed length, thus enforcing uniform workload across all nodes. Under the proposed dispatcher and worker node model, the proposed architecture can address both scenarios.

In the non-uniform segment-length scenario, each worker node may receive a different workload for processing. To enable scene-based encoding, the dispatcher node reads in the XML file (extracted from mezzanine) and determines the scene boundaries, especially how to partition or merge frames within the fade-in, /fade-out, and dissolving scenes into new scene cut boundaries. Among those new defined scenes, the dispatcher determines which scene should be encoded by which node. The output of this process will be a scene-to-segment (S2S) list (230). The main goal is to distribute the number of frames in each node as uniformly as possible. In an embodiment, without limitation, a metric to measure the uniformity in this stage is the standard deviation of the number of frames allocated in each node. A lower standard deviation implies more uniform workload in each node. In an embodiment, the S2S list may be derived as the output of an optimization problem for best uniform load across all nodes under uninterrupted scene-processing constraints.

Scene cuts may be defined in the XML file of the video source (202), but typically such metadata define color-grading boundaries. For example, a scene-cut flag can be inserted during a dissolving scene for the convenience of color grading so that during playback the display management process will not distort the colors. However, these XML data does not take into consideration that the baseline data is reshaped and that reshaping may affect the final look within a dissolve. In an embodiment, to avoid such issues, a dissolve may be partitioned into multiple single frames per scene to allow for a slow transition along the time domain. Note that this method will increase the bit rate of reshaping-related metadata during those special transition effects. The same techniques can be applied to fade-in and fade-out transitions.

When an XML file is not available, the dispatcher will need to identify scene cuts on its own, using any of the known scene-cut detection techniques known in the art. For example, in an embodiment, one can measure the luminance change along the time domain and see whether the change is in constant rate. Once a scene cut is detected, one can partition the entire scene cut into single frames, each frame representing a separate "scene."

In addition to the above methods, to avoid false scene-cut boundaries, one can also consider soft transitions near the scene-cut boundaries. For example, for a detected scene cut, one can add a small number of single-frame "scenes" before the scene cut and a small number of single-frame "scenes" after the scene cut. Such a method will increase the bit rate of scene-based metadata.

Given the scene-boundary decisions (215), the scene-to-segment unit (220) decides which scene should be included in which segment. This kind of assignment will yield a scene-to-segment assignment list (S2S list) (230). The dispatcher node will output one S2S list for each worker node.

Consider a video sequence with J total frames, grouped into K scenes. Denote the corresponding starting frame index for the k-th scene as $S_k$ and denote the number of frames for the k-th scene as $D_k$, where k=0, 1, . . . , K–1. Thus:

$$D_k=S_{k+1}-S_k,$$ (1)

$$J=\Sigma_{k=0}^{K-1}D_k,$$ (2)

Denote the number of worker nodes as M. To distribute the scenes to each node, in an embodiment, the following rules may be imposed:

A scene cannot be partitioned into two or more smaller sub-scenes to be processed in more than one node. In other words, a complete scene must be processed inside one node to maintain temporal stability and the compression efficiency of reshaping-related metadata.

A node should not process scenes that are not consecutive in time. For example, it is undesirable for node n to process scenes 3, 6, and 7, since scenes 3 and 6 are not consecutive and it would be required at some point to insert scenes 4 and 5 between scenes 3 and 6. Processing non-consecutive scenes would require a post-processing step to re-assemble all the scenes back in order, thus requiring extra post-processing.

Denote the collection of scenes assigned to node m as $\Phi_m$, where m=0, 1, . . . , M–1. Following the aforementioned rules, one can define the first scene index inside $\Phi_m$ as $\phi_m$, where $\phi_m$ has value range between 0 and K–1. In an embodiment, to simplify implementation, a monotonically incremental rule may be enforced that is:

$$\phi_m<\phi_n \text{ when } m<n$$

In an embodiment, $\phi_0=0$, thus, the first scene is always assigned to the first segment. When the number of scenes K is larger than the number of nodes M, $\phi_m$ must be unique, i.e., its value cannot be the same in any of the other nodes. This is to ensure no node has zero workload. When K<M, the simple solution is to assign each node one scene; and leave the rest of the nodes with zero scenes.

FIG. 3A depicts an example process (300) for a scene to segment allocation according to an embodiment. As depicted in FIG. 3A, the process starts with an initial random assignment (305). In this step, the list of K scenes is randomly segmented into M segments. That initial list will be further adjusted using an iterative algorithm. Step 305 initializes two sets:

candidate set ($\Omega^{(t)}$) is the original list of scene indices at the end of the t-th iteration (for t>0); and selected set ($\Psi^{(t)}$) is the list of the assigned scene indices at the end of the t-th iteration At the beginning of the operation, i.e. t=0, $\Omega^{(0)}$ includes all scenes except the first scene (i.e., $\Omega^{(0)}=\{\phi_m|m=1, . . . , K–1\}$) and $\Psi^{(0)}$ contains only the first scene $\phi_0$. In the t-th iteration (t>0), one randomly selects one element from $\Omega^{(t-1)}$, removes this element from $\Omega^{(t-1)}$, and puts this chosen element to set $\Psi^{(t)}$. This process is repeated M–1 times until $\Psi^{(t)}$ contains M elements which are sorted in ascending order. The sorted $\Psi^{(t)}$ will be the output from this stage. Table 1 expresses this process in pseudocode.

TABLE 1

Initialization step in scene to segment allocation

```
// initialize the candidate set and selected set
Ω⁽⁰⁾ = {φₘ|m = 1, . . . , K – 1}
Ψ⁽⁰⁾ = {φ₀}
// select other M–1 elements.
for( t = 1; t < M; t ++){
    // STEP 1: select a random element from the candidate set Ω⁽ᵗ⁻¹⁾
    β⁽ᵗ⁾ = K – t
    λ⁽ᵗ⁾ = ⌊β⁽ᵗ⁾ · rand(1)⌋     // random integer between 0 and K–t–1
    // STEP 2: remove the λ⁽ᵗ⁾ element from candidate set Ω⁽ᵗ⁻¹⁾
    Find the λ⁽ᵗ⁾ element w_λ₍ₜ₎ from Ω⁽ᵗ⁻¹⁾: φ⁽ᵗ⁾ = w_λ₍ₜ₎
    Ω⁽ᵗ⁾ = Ω⁽ᵗ⁻¹⁾\φ⁽ᵗ⁾ // remove the selected scene index
    Sort Ω⁽ᵗ⁾in ascending order
    // STEP 3: move this element to chosen set Ψ⁽ᵗ⁾
    Ψ⁽ᵗ⁾ = Ψ⁽ᵗ⁻¹⁾ ∪ φ⁽ᵗ⁾ // add the selected scene index
}
Sort Ψ⁽ᵗ⁾ in ascending order. // The elements in Ψ⁽ᵗ⁾are the selected { φₘ }
```

As an example, consider a list of 10 scenes to be allocated in 3 nodes, with each scene having a variable number of frames as depicted below

| Scene index (k) | 0 | 1 | 2 | 3 | 4 | 5 | 6 | 7 | 8 | 9 |
|---|---|---|---|---|---|---|---|---|---|---|
| # of frames ($D_k$) | 3 | 9 | 4 | 7 | 2 | 5 | 4 | 8 | 3 | 10 |

Let the output of step 305 be $\Psi^{(2)}=\{0, 3, 8\}$, then, after this step, scenes are assigned to nodes (or segments) as follows:

Node 0: scenes 0-2
Node 1: scenes 3 to 7
None 2: scenes 8-9

Figure 3B:
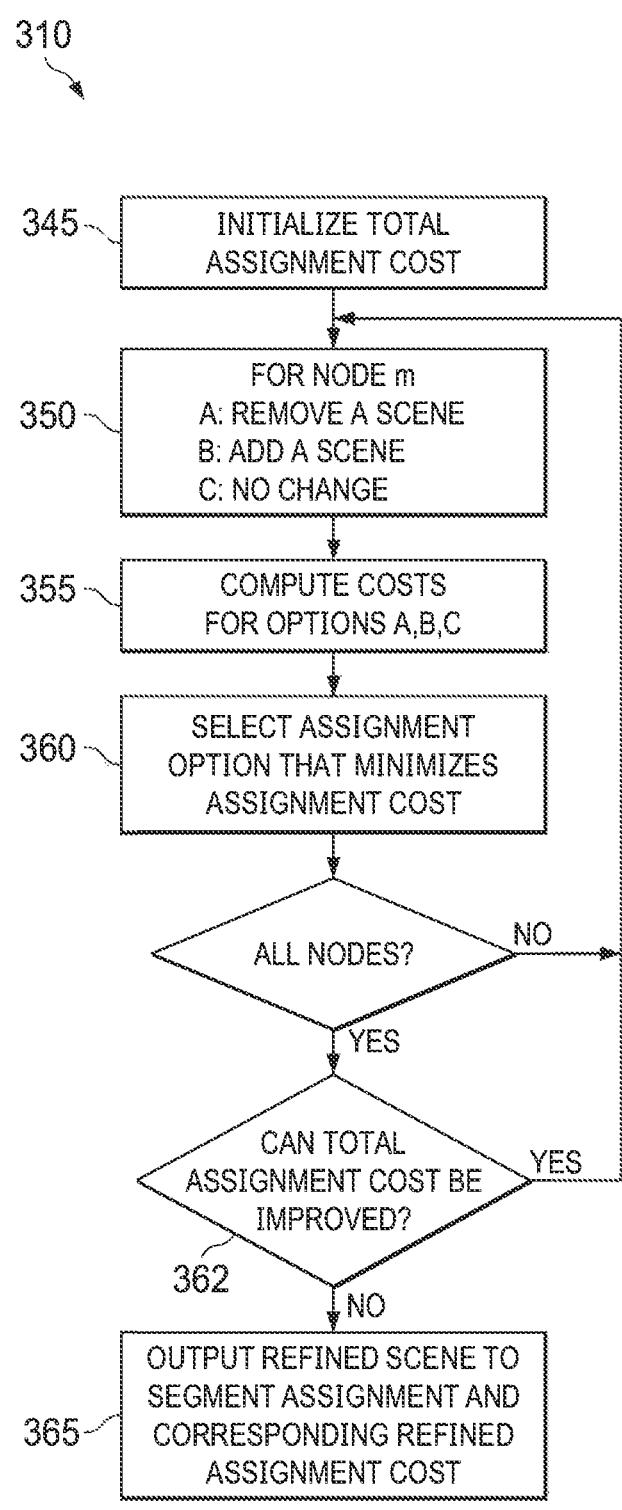
FIG. 3B depicts an example of a refine-assignment process within a scene-to-segment assignment process according to an embodiment.

In step 310, this initial, random assignment ($\Psi^{(M-1)}$), is further refined iteratively as shown in FIG. 3B. As depicted in FIG. 3B, there are two iterative steps: a) one at the node level (for all nodes) and b) one at the total assignment cost level (until convergence). Starting at step 345, the total assignment cost is initialized to a large value which may approximate the largest possible assignment cost (e.g., $\sigma_f^{opt}$=inf). Next, the algorithm iterates for each node m, m=0, 1, 2, . . . M−1. At each node iteration, looking at each node's workload, each node workload may be adjusted using three possible scenarios (350):

(A) remove its last scene and move it to the next node (this does not apply to node M−1)
  (B) add one more scene from its previous node (this does not apply to node 0)
  (C) maintain current assignment.

Among these three options, in step 355, one measures the assignment-related cost (e.g. the standard deviation of the number of frames in each segment). A lower cost implies a more uniform workload and it's more preferred. Thus, for each node, in step 360, the setting which yields the lowest assignment cost is selected. After all nodes have been processed, in step 362, the lowest assignment cost (e.g., $\sigma_f^{(t)}$) is compared with the existing total assignment cost (e.g., $\sigma_f^{opt}$). If the lowest assignment cost is considered lower than the total assignment cost, the value of the total assignment cost is updated with the lowest assignment cost and the process returns back to step 350. Otherwise, if there is no cost improvement, or the improvement is considered too small, in step 365, the refine-assignment stage 310 will terminate by outputting the last scene to segment assignment and its corresponding cost (that is, the last value of the total assignment cost), to be referred as the refined S2S assignment and the refined assignment cost.

In another embodiment, instead of starting the node iteration (e.g., steps 350, 355, and 360) at node 0 and moving forward, one may also begin the node iteration at node M−1 and move backwards. Alternatively, one may also try iterating among all nodes both ways and select the workload with the minimal cost between the two.

After stage 310, given the refined scene to segment allocation, in step 315, a new best overall assignment cost (and associated S2S assignment) may be computed. In an embodiment, to avoid a bad random initialization step 305, which may lead to sub-optimal allocation, steps 305-315 are repeated L times for L different random initialization steps 305 (e.g., by using a different random seed generator), each one resulting in an overall assignment cost(l), l=1, 2, . . . L (e.g., $\sigma_{f,l}^{opt}$). Then, in step 315, one selects the assignment with the best overall cost (e.g., the smallest standard deviation $\sigma_{f,l}^{opt}$). Experimental results showed that L=100 combined with the refined assignment step (310) yields satisfactory results and that larger values of L fail to significantly improve the overall S2S allocation strategy.

Thus, at l=1, $\sigma_{f,1}^{opt}$ simply represents the first refined assignment cost (that is, $\sigma_f^*=\sigma_{f,1}^{opt}=\sigma_f^{opt}$), where $\sigma_f^*$ denotes the best overall assignment cost. At subsequent iterations, if $\sigma_f^*<\sigma_{f,l}^{opt}$, then this iteration is ignored, otherwise, the best assignment cost is updated, (e.g., $\sigma_f^*=\sigma_{f,l}^{opt}$) and the corresponding workload for this iteration is considered the best scene to segment assignment.

Step 320 checks if all L iterations are done and, if yes, then in step 325, the best scene to segment allocation, that is the one with the best cost among all L iterations, is outputted, otherwise, the process repeats with another initial random assignment (305).

To facilitate the discussion, one more variable $\phi_M^{(t)}$=K is added to indicate the end of the video sequence. Given a set of $\{\phi_m^{(t)}\}$, m=0, 1, . . . , M, one can compute the number of frames in each node at the t-th iteration as $$f_m^{(t)} = \sum\nolimits_{i=\phi_m^{(t)}}^{\phi_{m+1}^{(t)}-1} D_i \text{ for } m = 0, 1, \ldots , M-1. \tag{3}$$

In an embodiment, the uniformity of workload, or assignment cost, can be defined as the standard deviation of $\{f_m^{(t)}\}$, where $$\mu_f^{(t)} = \frac{1}{M}\sum\nolimits_{m=0}^{M-1} f_m^{(t)} \tag{4}$$

$$\sigma_f^{(t)} = \left(\frac{1}{M}\sum\nolimits_{m=0}^{M-1}\left(f_m^{(t)} - \mu_f^{(t)}\right)^2\right)^{0.5}.$$

The lower value of $\sigma_f^{(t)}$ is, the more uniform workload is distributed to each node. Example pseudo code for this refine-assignment stage is listed in Table 2.

TABLE 2

Example code for a refine-assignment stage in scene to segment allocation

```
conv__flag = 0;
σf^opt = inf
t = 0;
Initial setting of {φm^(t)}for t= 0 from previous stage.
while( conv__flag == 0 ){
    σf^(t) = inf;
    t = t + 1;
    for( m = 0; m < M; m++ ){
        // STEP 1: assign one scene from current segment to next segment
        {φm^A,(t)}= {φm^(t)}
        if(φm+1^(t) − φm^(t)> 1 ) { // current segment has more than one scene
            φm+1^A,(t)=φm+1^A,(t)−1; // assign the last scene in current segment to next segment
        }
        Compute standard deviationσf^A,(t)
        // STEP 2: assign one scene from next segment to current segment
        {φm^B,(t)}= {φm^(t)}
        if( m < M−1 ){ // not the last segment
            if(φm+2^(t) − φm+1^(t)> 1 ) { // next segment has more than one scene
                φm+1^B,(t)=φm+1^B,(t)+1; // assign the first scene in next segment to current seg-
ment
        }
```

TABLE 2-continued

| Example code for a refine-assignment stage in scene to segment allocation |
|---|

```
        }
        Compute standard deviation σ_f^{B,(t)}
        // STEP C: no change
        {φ_m^{C,(t)}}= {φ_m^{(t)}}
        Compute standard deviation σ_f^{C,(t)}
        // STEP 4: find minimal standard deviation and update the list.
            α = ar gmin{ σ_f^{A,(t)}, σ_f^{B,(t)}, σ_f^{C,(t)}} // choose A or B or C α ∈ {A, B, C}
        {φ_m^{(t)}}={φ_m^{α,(t)}}
            σ_f^{(t)} = σ_f^{α,(t)}
    }
    If(σ_f^{(t)} < σ_f^{opt}){ // current std is lower than best one, continue iteration
            σ_f^{opt} = σ_f^{(t)}
    }
    else{ // cannot further improve, return the previous best result.
            return {φ_m^{(t-1)}}
            conv_flag = 1;
    }
}
```

While in an embodiment, and without limitation, the standard deviation of frames being used provides a good cost metric for the refine-assignment stage, alternative cost metrics may also be applied, such as:

The workload range measured as the maximum number of total assigned frames in a node minus the minimum number of total assigned frames in a node The workload average of total frames in each node (e.g., $\mu_f^{(t)}$ in equation (4))

$$\bar{\mu}_f^{(t)} = \left(\frac{1}{M}\right)\sum_{m=0}^{M-1}\left(\left|f_m^{(t)} - \mu_f^{(t)}\right|\right);$$

the average distance of workload in each node from the overall average

Returning to our example, Tables 3 and 4 depict the scene to segment allocation and corresponding S2S parameters after the random initialization stage. The overall cost, measured by the standard deviation among the values in $\{f_m^{(0)}\}$, can be computed as $\sigma_f^{(0)}=6.81$.

TABLE 3

| Example S2S allocation after initialization | | | | | | | | | |
|---|---|---|---|---|---|---|---|---|---|
| k | 0 | 1 | 2 | 3 | 4 | 5 | 6 | 7 | 8 | 9 |
| $(D_k)$ | 3 | 9 | 4 | 7 | 2 | 5 | 4 | 8 | 3 | 10 |
| m | | 0 | | | | 1 | | | | 2 |

TABLE 4

| Example allocation parameters after initialization stage | | | | | | |
|---|---|---|---|---|---|---|
| $\phi_0^{(0)}$ | $\phi_1^{(0)}$ | $\phi_2^{(0)}$ | $f_0^{(0)}$ | $f_1^{(0)}$ | $f_2^{(0)}$ | $\sigma_f^{(0)}$ |
| 0 | 3 | 8 | 16 | 26 | 13 | 6.81 |

Consider now an example of refined assignment (310). At the first iteration of this stage, where t=0, for the first node, m=0, three different strategies are tried, and the standard deviation, $\sigma_f^{(0)}$, for each case is measured. The results are depicted in Tables 5 and 6. As depicted in Table 5, under option A, node 0 is assigned only scenes 0 and 1, at a cost of 10.12, under option B, node 0 is assigned scenes 0-3, at a cost of 5.04, and under option C (no change from before)

the cost remains the same (6.81). Thus, option B is selected as the best strategy to continue to refine the assignment of scenes at subsequent nodes, where the same process will be repeated.

TABLE 5

| Example refined assignment for node 0 | | | | | | | | | |
|---|---|---|---|---|---|---|---|---|---|
| k | 0 | 1 | 2 | 3 | 4 | 5 | 6 | 7 | 8 | 9 |
| A | 3 | 9 | 4 | 7 | 2 | 5 | 4 | 8 | 3 | 10 |
| m | | 0 | | | 1 | | | | | 2 |
| B | 3 | 9 | 4 | 7 | 2 | 5 | 4 | 8 | 3 | 10 |
| m | | | 0 | | | 1 | | | | 2 |
| C | 3 | 9 | 4 | 7 | 2 | 5 | 4 | 8 | 3 | 10 |
| m | | 0 | | | | 1 | | | | 2 |

TABLE 6

| S2S parameters for options A, B, C for node 0 | | | | | | |
|---|---|---|---|---|---|---|
| | $\phi_0^{(0)}$ | $\phi_1^{(0)}$ | $\phi_2^{(0)}$ | $f_0^{(0)}$ | $f_1^{(0)}$ | $f_2^{(0)}$ | $\sigma_f^{(0)}$ |
| A | 0 | 2 | 8 | 12 | 30 | 13 | 10.12 |
| B | 0 | 4 | 8 | 23 | 19 | 13 | 5.04 |
| C | 0 | 3 | 8 | 16 | 26 | 13 | 6.81 |

At the end of t=0, in this example, the best S2S remained the one depicted in Table 6 with cost $\sigma_f^{opt}$ 5.04; that is:

Node 0: scenes 0-3

Node 1: scenes 4-7

Node 2: scenes 8-9

Next, at t=1, steps 350, 355, and 360 are repeated. In this example, at t=1 there is no improvement in the overall cost, thus the process will terminate.

In some embodiments, it may be preferred that all segments have the same number of frames. For such a scenario, one can assign the number of frames for the first M−1 nodes as $$\bar{F}_m = \left[\frac{J}{M}\right], m = 0, 1, \ldots , M - 2. \tag{5}$$

The remaining frames will be assigned to the last node (node M−1) as $$\bar{F}_{M-1} = \mathrm{J} - (M-1)\left\lceil \frac{\mathrm{J}}{M} \right\rceil. \tag{6}$$

Scene-Based Coding

Figure 4:
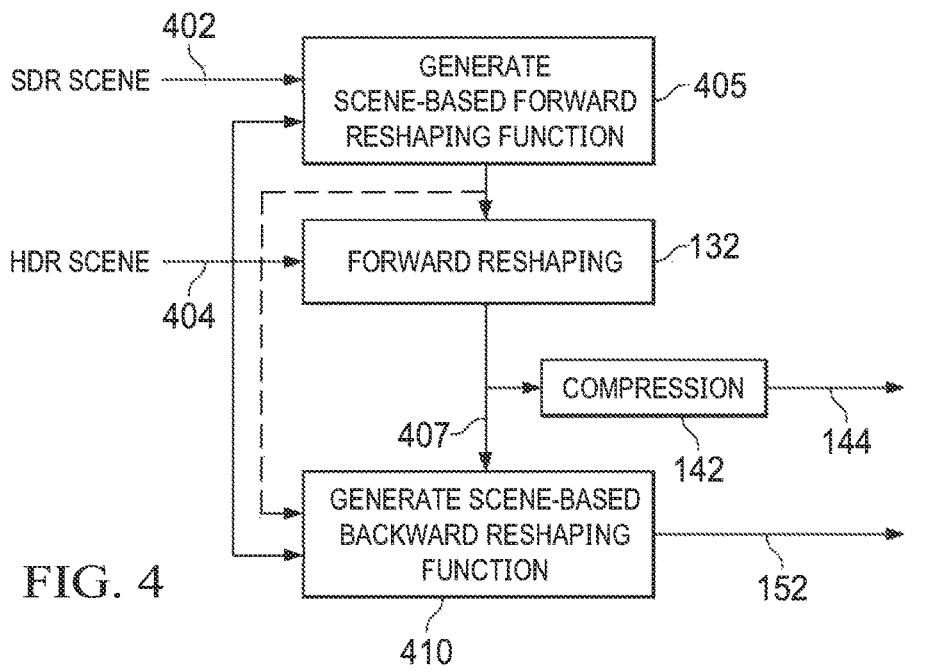
FIG. 4 depicts an example encoder for scene-based encoding using reshaping according to an embodiment of this invention.

Given a scene-to-segment allocation (230), FIG. 4 depicts an example architecture for scene-based encoding on each node in the cloud (210). Recall that the starting frame index for the k-th scene is denoted a $S_k$. Thus, given a scene k, a node needs to process frames $S_k$, $S_k+1$, $S_k+2$, . . . , and $S_{k+1}-1$. Reference HDR frames (404) and corresponding SDR frames (402) for a scene may be stored in corresponding SDR and HDR scene buffers (not shown).

From FIG. 4, in step 405, the input SDR and HDR frames are used to generate a scene-based forward reshaping function. The parameters of such a function will be used for the whole scene (vs. being updated on a frame-by-frame basis), thus reducing the overhead for metadata 152. Next, in step 132, forward reshaping is applied to the HDR scene (404) to generate a reshaped based layer 407, to be coded by compression unit (142) to generate the coded bitstream 144. Finally, in step 410, the reshaped SDR data 407 and the original HDR data (404) are used to generate parameters 152 for a backward reshaping function to be transmitted to a downstream decoder together. These steps will be described in more detail next. Without limitation, steps are described in the context of what is referred to as a three-dimensional mapping table (3DMT) representation where, to simplify operations, each frame is represented as a three dimensional mapping table, where each color component (e.g., Y, Cb, or Cr) is subdivided into "bins," and instead of using explicit pixel values to represent an image one uses the pixel averages within each bin. Details of the 3DMT formulation can be found in Ref. [3].

Scene-based generation of a forward reshaping function (405) consists of two levels of operation. First, statistics are collected for each frame. For example, for luma, one computes the histograms for both SDR ($h_j^s$ (b)) and HDR ($h_j^v$ (b)) frames and stores them in the frame buffer for the j-th frame, where b is the bin index. After generating the 3DMT representation for each frame, one generates an "a/B" matrix representation denoted as:

$$B_j^F = (S_j^F)^T S_j^F,$$

$$a_j^{F,ch} = (S_j^F)^T v_j^{F,ch}, \tag{7}$$

where ch refers to a luma or chroma channel (e.g., Y, Cb, or Cr), $(S_j^F)^T$ denotes a transpose matrix based on the reference HDR scene data and a parametric model of the forward reshaping function, and $v_j^{F,ch}$ denotes a vector based on the SDR scene data and the parametric model of the forward reshaping function.

Given the statistics of each frame within the current scene, one can apply a scene-level algorithm to compute the optimal forward reshaping coefficients. For example, for luma, one can generate scene-based histograms for SDR ($h^s(b)$) and HDR data ($h^v$ (b)) by summing or averaging the frame-based histograms. For example, in an embodiment, $$h^s(b) = \sum_{j=S_k}^{S_{k+1}-1} h_j^s(b), \tag{8}$$

$$h^v(b) = \sum_{j=S_k}^{S_{k+1}-1} h_j^v(b).$$

Having both scene-level histograms, one can apply cumulative density function (CDF) matching (Ref. [4-5]) to generate the forward mapping function (FLUT) from HDR to SDR, e.g., $$\bar{T}^F = CDF\_MATCHING(h^v(b), h^s(b)). \tag{9}$$

For chroma (e.g., ch=Cb or ch=Cr), one may again average over the a/B frame-based representations in equations (7) to generate a scene-based a/B matrix representation given by $$B^F = \frac{1}{S_{k+1} - S_k} \sum_{j=S_k}^{S_{k+1}-1} B_j^F, \tag{10}$$

$$a^{F,ch} = \frac{1}{S_{k+1} - S_k} \sum_{j=S_k}^{S_{k+1}-1} a_j^{F,ch},$$

and generate parameters for a multiple-color, multiple-regression (MMR) model of a reshaping function as (Ref. [2-3])

$$m^{F,ch} = (B^F)^{-1} a^{F,ch}. \tag{11}$$

Then, the reshaped SDR signal (407) can be generated as:

$$\hat{v}_j^{F,ch} = B^F m^{F,ch}. \tag{12}$$

Generating the scene-based backward reshaping function (410) includes also both frame-level and scene-level operations. Since the luma mapping function is a single-channel predictor, one can simply revert the forward reshaping function to obtain the backward reshaping function. For chroma, one forms a 3DMT representation using the reshaped SDR data (407) and the original HDR data (404) and computes a new frame-based a/B representation as:

$$B_j^B = (S_j^B)^T S_j^B,$$

$$a_j^{B,ch} = (S_j^B)^T v_j^{B,ch}. \tag{13}$$

At the scene-level, for luma, one may apply the histogram-weighted BLUT construction in Ref. [3] to generate the backward luma reshaping function. For chroma, one can again average the frame-based a/B representation to compute a scene-based a/B representation $$B^B = \frac{1}{S_{k+1} - S_k} \sum_{j=S_k}^{S_{k+1}-1} B_j^B, \tag{14}$$

$$a^{B,ch} = \frac{1}{S_{k+1} - S_k} \sum_{j=S_k}^{S_{k+1}-1} a_j^{B,ch},$$

with an MMR model solution for the backward reshaping mapping function given by $$m^{B,ch} = (B^B)^{-1} a^{B,ch}. \tag{15}$$

Then, the reconstructed HDR signal (160) can be generated as:

$$\hat{v}_j^{B,ch} = B^B m^{B,ch}. \tag{16}$$

REFERENCES

Each of these references is incorporated by reference in its entirety.

1. H. Kadu et al., "Coding of high-dynamic range video using segment-based reshaping," U.S. Pat. No. 10,575,028.
2. G-M. Su et al., "Multiple color channel multiple regression predictor," U.S. Pat. No. 8,811,490.

3. Q. Song et al., PCT Patent Application Ser. No. PCT/US2019/031620, "High-fidelity full reference and high-efficiency reduced reference encoding in end-to-end single-layer backward compatible encoding pipeline," filed on May 9, 2019, published as WO 2019/ 217751.

4. B. Wen et al., "Inverse luma/chroma mappings with histogram transfer and approximation," U.S. Pat. No. 10,264,287.

5. H. Kadu and G-M. Su, "Reshaping curve optimization in HDR coding," U.S. Pat. No. 10,397,576.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to workload allocation and node-based processing in cloud-based video coding of HDR video, such as those described herein. The computer and/or IC may compute, any of a variety of parameters or values that relate to workload allocation and node-based processing in cloud-based video coding of HDR video as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for workload allocation and node-based processing in cloud-based video coding of HDR video as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Enumerated example embodiments (EEE) of the present invention are defined, without limitation, as follows:

EEE1. A method for allocating a sequence of scenes to segments to be encoded by one or more computing nodes, the method comprising:

receiving a sequence of scenes, wherein each scene comprises one or more video frames; and performing one or more assignment iterations to generate a best output assignment, wherein performing the one or more assignment iterations comprises:

for an iteration in the one or more assignment iterations:

generating an initial random assignment (305) of the sequence of scenes to M computing nodes based on a random seed selection for the assignment iteration, wherein M>1;

performing a refine-assignment step (310) based on the initial random assignment to generate a refined assignment of the sequence of scenes to the M computing nodes and a refined assignment cost; and updating a best assignment cost and the best output assignment (315) based on the refined assignment and the refined assignment cost.

EEE2. The method of EEE1, wherein performing the refine-assignment step (310) comprises:

initializing a total assignment cost with a first value;

for each computing node setting a node workload according to the initial random assignment of the sequence of scenes to the M computing nodes; and repeating until convergence:

sequentially for each node, starting from the first node:

removing a scene from the node workload and allocating it to the workload of its next available node, and computing a first cost metric for the M computing nodes;

adding a scene to the node workload taken from the workload of its prior available node, and computing a second cost metric for the M computing nodes;

keeping the node workload unchanged, and computing a third cost metric for the M computing nodes; and generating (360) an updated node workload based on a minimum among the first cost metric, the second cost metric, and the third cost metric;

computing an iteration assignment cost based on the updated node workload; and if the total assignment cost is smaller than the iteration assignment cost, then: signaling convergence, outputting the updated node workload as the refined assignment, and outputting the total assignment cost as the refined assignment cost, else: continuing by replacing the total assignment cost with the iteration assignment cost.

EEE3. The method of EEE2, wherein the first value comprises an estimate of the largest possible standard deviation of the total number of frames assigned to each node.

EEE4. The method of any of EEE1-EEE3, wherein generating the initial random assignment comprises:

generating a candidate set with scene indices from 1 to K−1, where K denotes a total number of scenes in the sequence of scenes to be allocated to the M computing nodes;

generating an assignment set with first element 0;

updating the assignment set according to a random selection with the random seed selection to generate an updated assignment set;

sorting the updated assignment set in ascending order to generate a sorted assignment set; and generating the initial random assignment according to the sorted assignment set, wherein updating the assignment set comprises:

for t=1 to M−1:

selecting a random integer p between 0 and K−t−1;

identifying the p-th element in the candidate set and appending it to the assignment set;

removing the p-th element in the candidate set; and sorting the candidate set in ascending order.

EEE5. The method of EEE4, wherein generating the initial random assignment according to the sorted assignment set comprises:

assigning to node m all scenes with indices between values equal or larger to the m-th element in the sorted assignment set but smaller than the m+1 element in the sorted assignment set.

EEE6. The method of any of EEE1-EEE5, wherein computing a cost metric for all computing nodes based on a scene to node assignment for each computing node comprises:

for each computing node computing a total number of frames assigned to the computing node based on the scene to node assignment; and computing a standard deviation of the total number of frames assigned to each computing node.

EEE7. The method of any of EEE1-EEE6, wherein removing a scene from the node workload and allocating it to the workload of its next available node comprises:

identifying the last scene assigned to the node and allocating it as the first scene to the workload of its next available node.

EEE8. The method of any of EEE1-EEE7, wherein adding a scene to the node workload taken from the workload of its prior available node comprises:

identifying the last scene assigned to the prior available node and allocating it as the first scene to the node workload.

EEE9. The method of any of EEE1-EEE8, wherein updating the best assignment cost and the best output assignment comprises:

for the first assignment iteration, setting as the best output assignment the refined assignment and setting as the best assignment cost the refined assignment cost; and for subsequent assignment iterations, comparing the refined assignment cost with the best assignment cost; and if the best assignment cost is bigger than the refined assignment cost, then selecting as the best output assignment the refined assignment and selecting as the best assignment cost the refined assignment cost.

EEE10. The method of any of EEE1-EEE9, further comprising:

for a node among the M computing nodes:

accessing according to the best output assignment of the sequence of scenes to the node a sequence of high-dynamic range (HDR) frames and a sequence of corresponding standard dynamic range frames (SDR) for a scene assigned to the node; and generating for the scene assigned to the node an output bitstream.

EEE11. The method of EEE10, wherein generating the output bitstream further comprises:

generating a scene-based forward reshaping function based on the sequence of HDR frames and the sequence of SDR frames;

mapping the sequence of HDR frames to a sequence of reshaped SDR frames based on the scene-based forward reshaping function;

generating a coded bitstream by compressing the sequence of reshaped SDR frames;

generating a scene-based backward reshaping function based on the sequence of reshaped SDR frames, the sequence of HDR frames, and the scene-based forward reshaping function;

generating metadata based on parameters of the scene-based backward reshaping function; and outputting the output bitstream comprising the coded bitstream and the metadata.

EEE12. A non-transitory computer-readable storage medium having stored thereon computer-executable instructions for executing with one or more processors a method in accordance with any one of the EEE1-EEE11.

EEE13. An apparatus comprising a processor and configured to perform any one of the methods recited in EEE1-EEE11.

Example embodiments that relate to workload allocation and node-based processing in cloud-based video coding of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is claimed:

1. A method for allocating scenes of a sequence of scenes to be encoded by a plurality of computing nodes, the method comprising:

receiving a sequence of scenes, wherein each scene comprises one or more video frames; and performing one or more assignment iterations to generate a best output assignment in which each scene of the sequence of scenes is scheduled for encoding at a particular computing node of M computing nodes, wherein M>1, wherein performing the one or more assignment iterations comprises:

for an assignment iteration in the one or more assignment iterations:

generating, for each computing node, an initial random assignment of M segments of scenes of the sequence of scenes to the M computing nodes, wherein each segment of scenes in the M segments of scenes of the sequence of scenes is assigned in the initial random assignment to a respective computing node of the M computing nodes;

performing, for each computing node, a refine-assignment step (310) based on the initial random assignment to generate a refined assignment of the M segments of scenes of the sequence of scenes to the M computing nodes, wherein each segment of scenes in the M segments of scenes of the sequence of scenes is assigned in the refined assignment to a respective computing node of the M computing nodes; wherein a refined assignment cost reflecting a workload imposed on the respective computing node when encoding assigned scenes in the segment of scenes is generated; and updating a best assignment cost and the best output assignment based on the refined assignment such that a uniformity of workload distribution across the M computing nodes is maximized;

wherein each node in the M computing nodes is assigned in the initial random assignment with first scenes that are consecutive in the sequence of scenes; wherein each node in the M computing nodes is assigned in the refined assignment with second scenes that are consecutive in the sequence of scenes.

2. The method of claim 1, wherein maximizing the uniformity of workload distribution across the computing nodes comprises minimizing an overall refined assignment cost for the M computing nodes.

3. The method of claim 1, wherein performing the refine-assignment step comprises:

initializing a total assignment cost with a first value;

for each computing node m setting a current node workload according to the initial random assignment of the sequence of scenes to the M computing nodes; and repeating until convergence:

sequentially for each computing node m, starting from computing node m=0 until reaching computing node m=M−1:

generating a first adjusted node workload of computing node m by removing, for computing nodes m<M−1 only, a scene from the current node workload of the computing node m and generating an adjusted node workload of computing node m+1 by adding the scene to a current node workload of computing node m+1, and computing a first cost metric for the M computing nodes;

generating a second adjusted node workload of computing node m by adding, for computing nodes m>0 only, a scene to the current node workload of computing node m, and generating an adjusted node workload of computing node m−1 by removing the scene from a node workload of computing node m−1, and computing a second cost metric for the M computing nodes;

avoiding generating adjusted node workloads for computing node m, and computing a third cost metric for the M computing nodes; and generating an updated node workload based on a minimum among the first cost metric, the second cost metric, and the third cost metric;

computing an iteration assignment cost based on the updated node workload; and if the total assignment cost is smaller than the iteration assignment cost, then: signaling convergence, outputting the updated node workload as the refined assignment, and outputting the total assignment cost as the refined assignment cost, else: continuing by replacing the total assignment cost with the iteration assignment cost.

4. The method of claim 1, wherein generating the initial random assignment comprises:

initializing a candidate set with scene indices from 1 to K−1, where K denotes a total number of scenes in the sequence of scenes to be allocated to the M computing nodes, wherein K is greater than M;

initializing an assignment set with scene index 0;

updating the assignment set to generate an updated assignment set;

wherein updating the assignment set comprises:

for t=1 to M−1:

selecting a random integer p between 0 and K−t−1;

identifying the p-th element in the candidate set and appending it to the assignment set;

removing the p-th element in the candidate set; and sorting the candidate set in ascending order;

sorting the updated assignment set in ascending order to generate a sorted assignment set; and generating the initial random assignment according to the sorted assignment set.

5. The method of claim 4, wherein generating the initial random assignment according to the sorted assignment set comprises:

assigning to computing node m all scenes with scene indices between values equal to or larger than the m-th element in the sorted assignment set but smaller than the (m+1)-th element in the sorted assignment set.

6. The method of claim 3, wherein computing a cost metric for all computing nodes based on a scene to node assignment for each computing node comprises:

for each computing node computing a total number of frames assigned to the computing node based on the scene to node assignment; and computing a standard deviation of the total number of frames assigned to each computing node.

7. The method of claim 3, wherein removing a scene from the node workload and allocating it to the workload of computing node m+1 comprises:

identifying the last scene scheduled for encoding at computing node m and allocating it as the first scene to be scheduled for encoding at computing node m+1.

8. The method of claim 3, wherein adding a scene to the node workload taken from the workload of computing node m−1 comprises:

identifying the last scene scheduled for encoding at computing node m−1 and allocating it as the first scene to be scheduled for encoding at computing node m.

9. The method of claim 1, wherein updating the best assignment cost and the best output assignment comprises:

for the first assignment iteration, setting as the best output assignment the refined assignment and setting as the best assignment cost the refined assignment cost; and for subsequent assignment iterations, comparing the refined assignment cost with the best assignment cost; and if the best assignment cost is bigger than the refined assignment cost, then selecting as the best output assignment the refined assignment and selecting as the best assignment cost the refined assignment cost.

10. The method of claim 1, further comprising:

for a computing node among the M computing nodes:

accessing according to the best output assignment of the sequence of scenes to the computing node a sequence of high-dynamic range (HDR) frames and a sequence of corresponding standard dynamic range (SDR) frames for a scene assigned to the computing node; and generating for the scene assigned to the computing node an output bitstream.

11. The method of claim 10, wherein generating the output bitstream further comprises:

generating a scene-based forward reshaping function based on the sequence of HDR frames and the sequence of SDR frames;

mapping the sequence of HDR frames to a sequence of reshaped SDR frames based on the scene-based forward reshaping function;

generating a coded bitstream by compressing the sequence of reshaped SDR frames; generating a scene-based backward reshaping function based on the sequence of reshaped SDR frames, the sequence of HDR frames, and the scene-based forward reshaping function;

generating metadata based on parameters of the scene-based backward reshaping function; and outputting the output bitstream comprising the coded bitstream and the metadata.

12. A computer-readable storage medium having stored thereon computer-executable instructions for executing with one or more processors a method in accordance with claim 1.

13. An apparatus comprising a processor and configured to perform the method recited in claim 1.

* * * * *